United States Patent [19]

Olnowich

[11] Patent Number: 5,465,333
[45] Date of Patent: Nov. 7, 1995

[54] APPARATUS FOR PROGRAMMING THE SPEED AT WHICH AN EXPANSION CARD GENERATES READY SIGNALS TO INSURE COMPATIBILITY WITH THE SPEED OF AN ATTACHED BUS

[75] Inventor: Howard T. Olnowich, Endwell, N.Y.

[73] Assignee: International Business Machines Corporation, Armonk, N.Y.

[21] Appl. No.: 389,606

[22] Filed: Feb. 15, 1995

Related U.S. Application Data

[63] Continuation of Ser. No. 146,472, Nov. 2, 1993, abandoned, which is a continuation of Ser. No. 543,276, Jun. 25, 1990, abandoned.

[51] Int. Cl.$^6$ .................................................. G06F 13/00
[52] U.S. Cl. ........................ 395/281; 364/DIG. 1; 364/239.1; 364/240; 364/240.1; 364/271.1; 364/271.5; 364/271.6; 395/310; 395/822; 395/878
[58] Field of Search ........................ 340/825.14, 825.2; 395/275, 325, 500, 550, 800

[56] References Cited

U.S. PATENT DOCUMENTS

| | | | |
|---|---|---|---|
| 3,673,576 | 6/1972 | Donaldson, Jr. | 395/275 |
| 3,774,164 | 11/1973 | Osterberg et al. | 395/275 |
| 3,919,695 | 11/1975 | Gooding | 395/550 |
| 3,950,735 | 4/1976 | Patel | 395/275 |
| 3,988,716 | 10/1976 | Fletcher et al. | 395/550 |
| 4,145,755 | 3/1979 | Suzuki et al. | 395/550 |
| 4,229,788 | 10/1980 | Consioli et al. | 395/275 |
| 4,375,103 | 2/1983 | Arneth et al. | 395/109 |
| 4,476,527 | 10/1984 | Clayton, IV | 395/275 |
| 4,507,732 | 3/1985 | Catiller et al. | 395/275 |
| 4,514,647 | 4/1985 | Shoji | 307/269 |
| 4,628,445 | 12/1986 | Buonomo et al. | 395/275 |
| 4,680,781 | 7/1987 | Amundson et al. | 375/8 |
| 4,872,107 | 10/1989 | Marple et al. | 395/700 |
| 4,931,924 | 6/1990 | Kageura | 395/500 |
| 4,943,907 | 7/1990 | Godwin | 395/775 |
| 4,991,085 | 2/1991 | Pleva et al. | 395/275 |
| 5,014,236 | 5/1991 | Pogorelski et al. | 395/275 |
| 5,070,443 | 12/1991 | Priem et al. | 395/725 |
| 5,109,490 | 4/1992 | Arimilli et al. | 395/325 |
| 5,121,492 | 6/1992 | Saville, III et al. | 395/500 |
| 5,123,092 | 6/1992 | Buxton et al. | 395/250 |
| 5,138,703 | 8/1992 | Igarashi | 395/325 |
| 5,155,812 | 10/1992 | Ehlig et al. | 395/275 |
| 5,159,679 | 10/1992 | Culley | 395/425 |
| 5,210,856 | 5/1993 | Auvinen et al. | 395/550 |
| 5,218,690 | 6/1993 | Boioli et al. | 395/500 |

FOREIGN PATENT DOCUMENTS

| | | |
|---|---|---|
| 0133359 | 7/1984 | European Pat. Off. . |
| 0138045 | 9/1984 | European Pat. Off. . |

*Primary Examiner*—Thomas C. Lee
*Assistant Examiner*—Lance L. Barry
*Attorney, Agent, or Firm*—Robert S. Babayi

[57] ABSTRACT

An apparatus is disclosed for processing information including a bus, a controller circuit, the controller circuit being configured to control transfer of information over the bus, and a slave circuit. The slave circuit includes a slave timing circuit which variably generates a ready signal indicating when the slave can accept data to allow the slave circuit to function in computer systems having different bus speeds. The controller circuit and the slave circuit exchange information via the bus at a speed controlled by the ready signal.

5 Claims, 3 Drawing Sheets

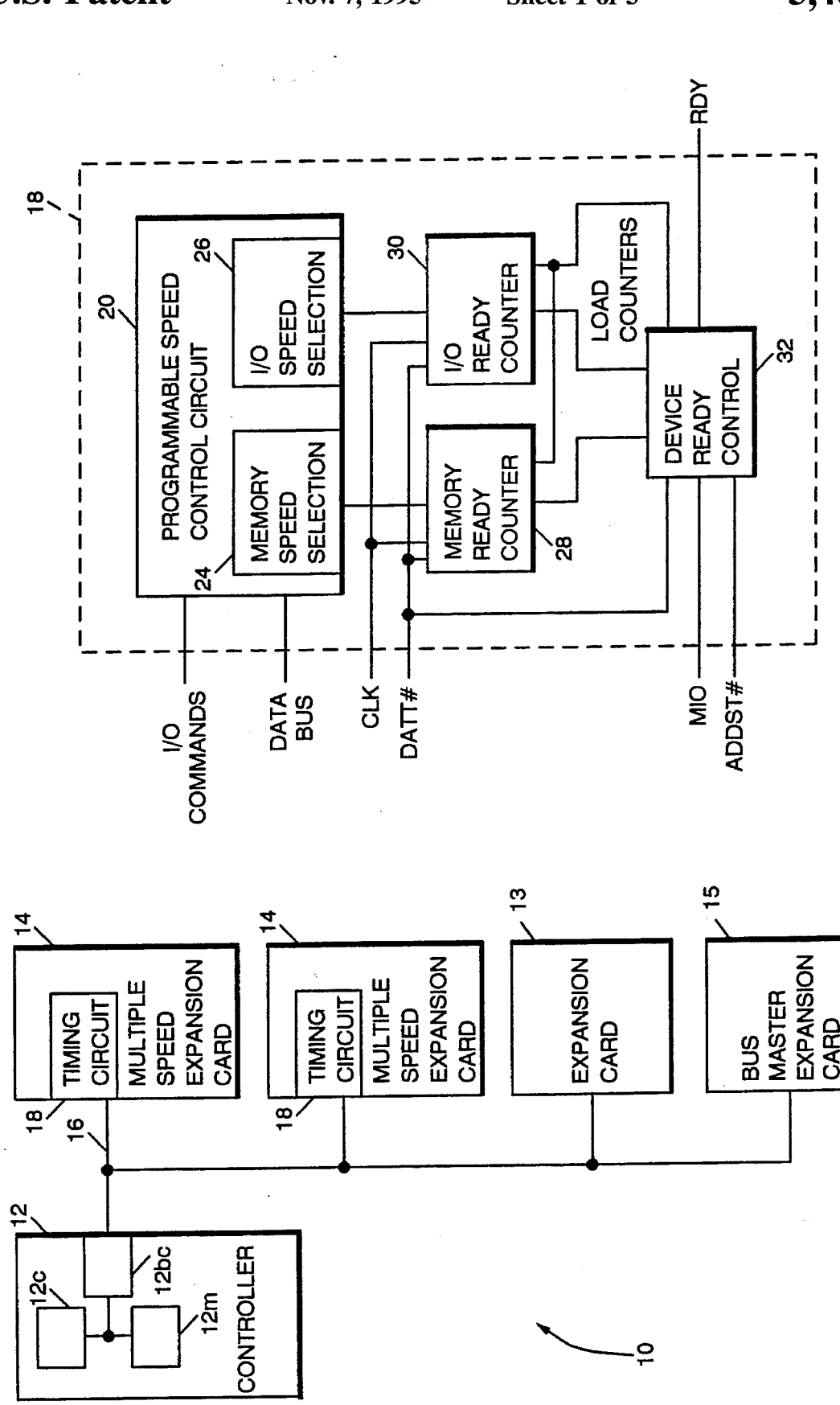

APPARATUS FOR PROGRAMMING THE SPEED AT WHICH AN EXPANSION CARD GENERATES READY SIGNALS TO INSURE COMPATIBILITY WITH THE SPEED OF AN ATTACHED BUS

This is a continuation of application Ser. No. 08/146,472 filed Nov. 2, 1993, now abandoned, which is a continuation of prior/parent application Ser. No. 07/543,276 filed Jun. 25, 1990, now abandoned.

BACKGROUND OF THE INVENTION

The present invention relates to computer systems which are configured to receive expansion cards.

Generally in computer systems and especially in personal computer systems, data are transferred between various elements such as a central processing unit (CPU), input/output (I/O) adapters, I/O devices such as bus masters (i.e., elements which can control the computer system) or bus slaves as well as memory devices such as the system memory. These elements are often interconnected via a system bus which is part of a system architecture. The architecture is designed for the movement of data, address and command information with or between these elements. In personal computer systems, one such architecture has become an industry standard and is here referred to as the Family I bus architecture.

The Family I bus architecture has become widely used by personal computers such as the IBM PC and PC/AT. The Family I bus architecture transfers information using eight parallel paths (an 8-bit wide bus) or 16 parallel paths (a 16-bit wide bus). A significant feature of the Family 1 bus architecture is the requirement of performing all transfers in synchronization with one basic clock signal, hereinafter referred to as a CLK signal. The CLK signal is an 8 MHZ signal which is provided to every element which is connected to the bus.

Because of the popularity of the Family I bus architecture, it has become advantageous to extend the Family I architecture to a 32-bit wide format. Customer acceptance requires maintaining downward compatibility with the original Family I bus architecture. Presently, maintaining downward compatibility requires that all elements on the architecture's bus operate at the original Family I clock rate of approximately 8 MHz. Techniques for allowing the bus to operate at different speeds have been proposed.

SUMMARY OF THE INVENTION

In one aspect, the invention is an apparatus for processing information including a bus, a controller circuit controlling transfer of information over the bus, and a slave circuit. The slave circuit includes a slave timing circuit which variably generates a ready signal indicating when the slave can accept data. The controller circuit and the slave circuit exchange information via the bus at a speed related to the ready signal.

In preferred embodiments, the slave timing circuit includes a speed selection circuit which provides speed information based upon speed selection information provided by the controller circuit, the slave timing circuit includes a counter circuit which provides a generate ready signal based upon the speed information, the slave timing circuit includes a device control circuit which receives the generate ready signal and generates the ready signal based upon timing information provided by the controller circuit via the bus, and the timing information includes a start transfer control signal which indicates at what time to initiate a transfer via the bus.

For a fuller understanding of the invention, reference should be had to the following detailed description, taken in connection with the accompanying drawings. Throughout the specification and drawings, # indicates a logical NOT signal.

BRIEF DESCRIPTION OF THE DRAWINGS

FIG. 1 shows a computer system which includes cards according to the present invention.

FIG. 2 shows a diagrammatic-block diagram of a timing circuit of the FIG. 1 multiple speed expansion card.

DETAILED DESCRIPTION

Figure 3:
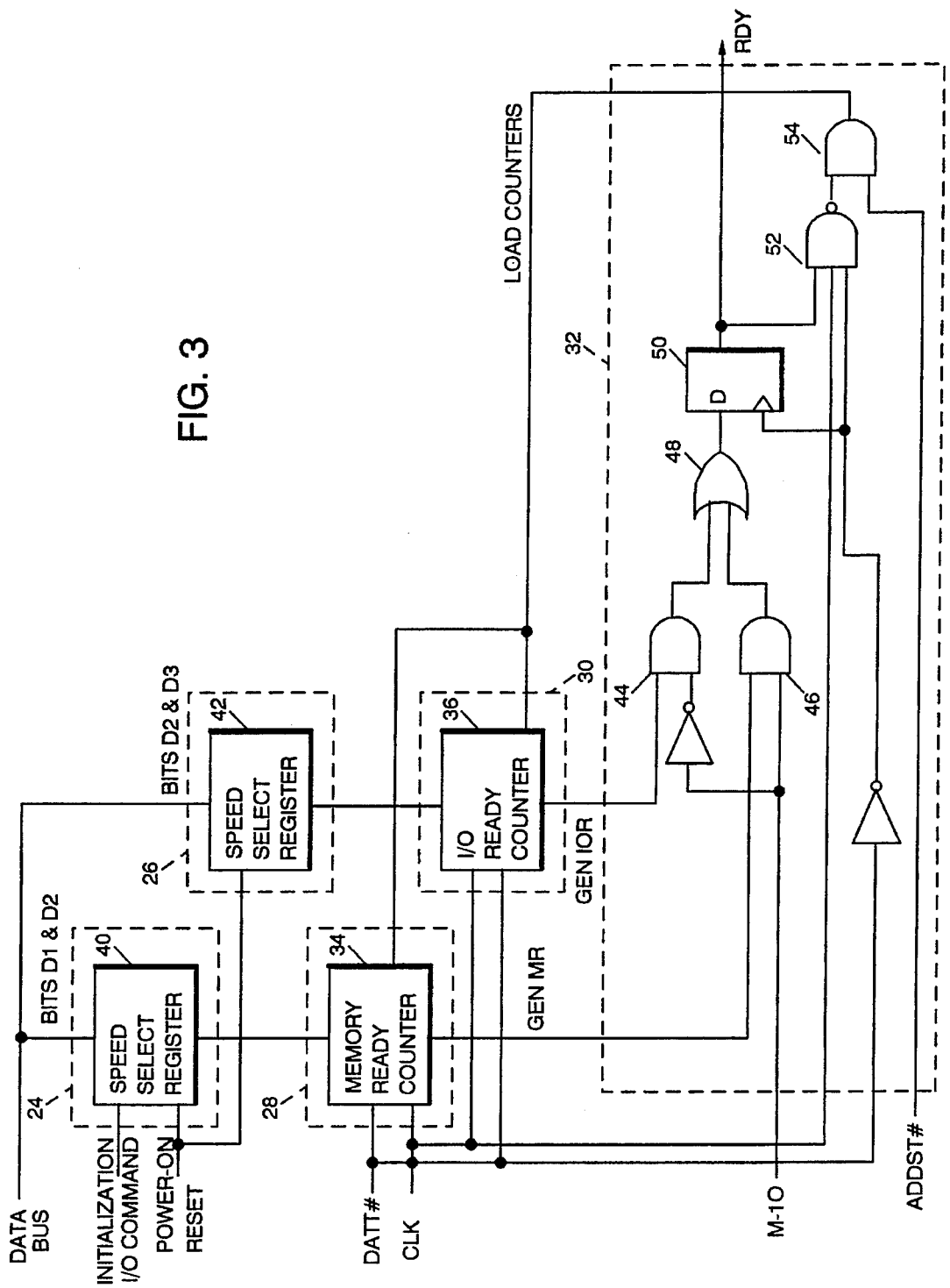
FIG. 3 shows a schematic diagram of the FIG. 2 timing circuit.

Referring to FIG. 1, computer system 10 includes controller circuit 12 which includes CPU 12c, bus control circuit 12bc and system memory 12m, fixed speed expansion card 13, a plurality of multiple speed expansion cards 14 and bus master expansion card 15, which may function as a controller circuit. CPU 12c and system memory 12m of controller circuit 12 communicate with expansion cards 13, 14, 15 via digital, multibit, parallel bus 16 under the control of bus control circuit 12bc. Expansion cards 13, 14, 15 also communicate with other expansion cards 13, 14, 15 via bus 16 under the control of bus controller 12bc. Each multiple speed expansion card 14 includes timing circuit 18 which receives signals from and provides signals to bus 16. It is understood that computer system 10 is not limited to this configuration but can include any combination of expansion cards 13, 14, 15.

Referring to FIGS. 2 and 3, timing circuit 18 provides a card ready signal (RDY) which is programmable and variable based upon control information which is received from bus 16. More specifically, timing circuit 18 includes programmable speed control circuit 20 which programmably defines the speed of the RDY signal based upon control information which is received from controller circuit 12 via the data portion of bus 16. The control information includes a memory speed selection value which is stored in memory speed selection circuit 24 and an I/O speed selection value which is stored in I/O speed selection circuit 26. These values are provided to timing circuit 20 when computer system 10 is initialized.

The values stored in circuits 24, 26 are accessed when multiple speed expansion card 14 is addressed by either controller circuit 12 or bus master expansion card 15 to perform a data transfer sequence over bus 16. The data transfer sequence is either a memory transfer or a I/O transfer. A memory or I/O control signal (MIO), which is provided to card 14 via bus 16, indicates the type of transfer to be performed. A high MIO signal indicates a memory transfer and a low MIO signal indicates an I/O transfer.

Memory ready counter 28 and I/O ready counter 30 control the response time of the RDY signal depending on the speed information which is provided by circuits 24, 26, respectively. The memory and I/O values may be different so that each operation can have a unique programmed response time. Counters 28, 30 continuously provide the generate ready signals (GEN MR, GEN IOR) for each type of transfer; device control circuit 32 selects the appropriate generate ready signal and transmits the RDY signal to bus 16 based upon the state of the MIO control signal which is received from bus 16 and the GEN MR and GEN IOR signals.

Generating a RDY signal which is programmable and variable allows expansion card 14 to be used with computer systems having different system clock speeds. Because memory and I/O operations require a preset amount of time to execute, the RDY signal may be used to slow bus transfers by signalling that the requested transfer may not yet be performed, or to enable transfers by signalling that the requested transfer may be performed. Thus, by varying the number of system clock cycles needed to generate the RDY signal as the bus speed changes, the amount of time allowed to perform functions on expansion card 14 remains unchanged. More specifically, increasing the number of system clock cycles needed to generate the RDY signal allows expansion card 14 to operate in a system having a faster bus speed and decreasing the number of system clock cycles needed to generate the RDY signal allows expansion card 14 to operate in a system having a slower bus speed. Additionally, because the RDY signal is used, no new signal paths need be added to bus 16 to provide the multiple speed feature.

Figure 4:
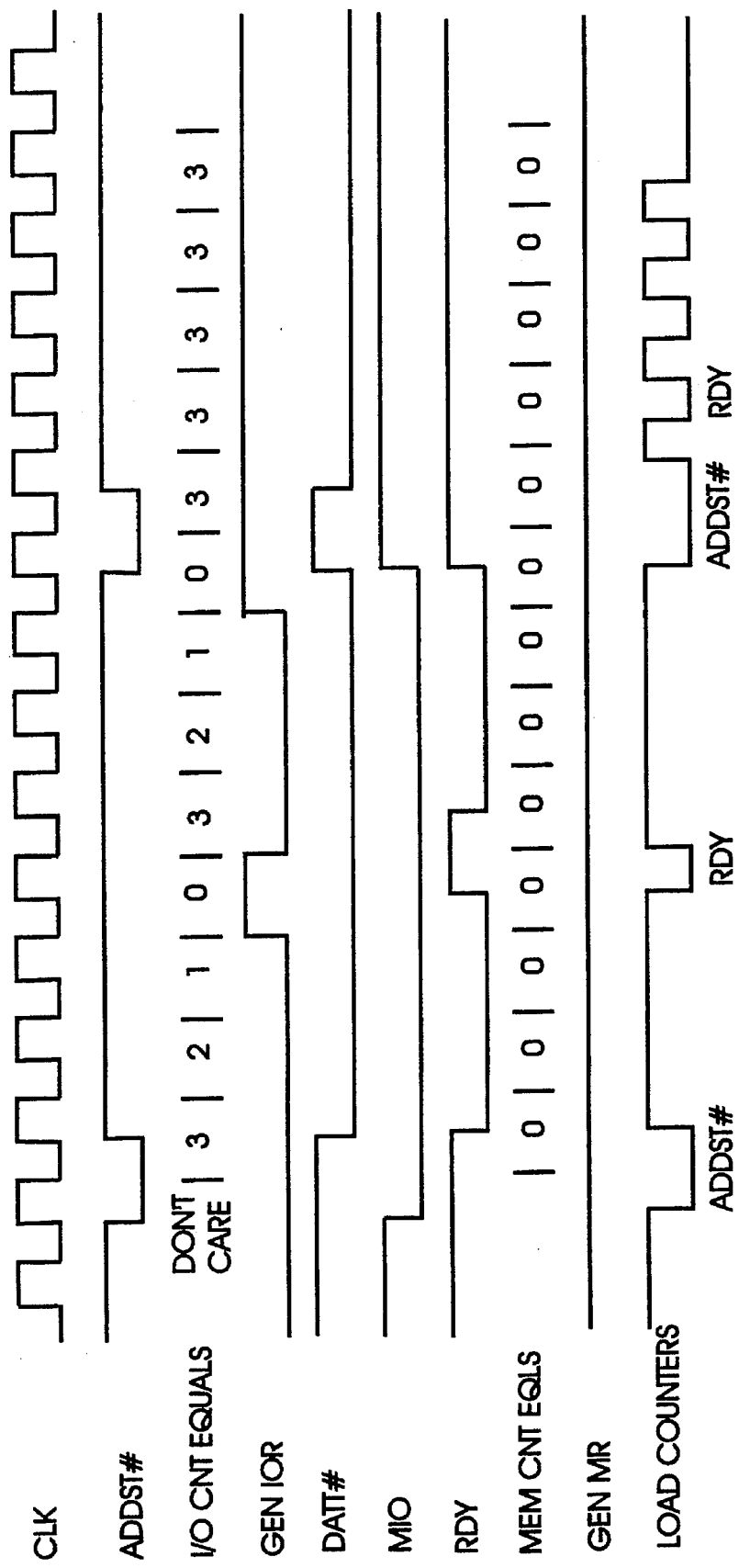
FIG. 4 is a timing diagram of the FIG. 2 timing circuit.

Referring to FIGS. 3 and 4, memory speed selection circuit 24 includes register 40 and I/O speed selection circuit 26 includes register 42. Registers 40 and 42 contain the selection values for memory and I/O speeds, respectively. Both of these registers are loaded under program control via the data portion of bus 16 when a predefined I/O command is active.

In the preferred embodiment, registers 40, 42 are each 2-bits wide, and are loaded from data bits 0 and 1 and data bits 2 and 3, respectively, of bus 16 when the I/O command is active. Registers 40, 42 are preset to a default state corresponding to an 8 MHz bus speed during power-on reset so that a valid RDY signal response may be provided in response to the I/O command that is used to load registers 40, 42. This default state is necessary because registers 40, 42 directly control all ready signals which are issued by expansion card 14. Additionally, if expansion card 14 is added to an existing system which does not implement the multiple speed feature, card 14 operates properly.

The two bits stored by register 40 are provided to counter 28; the two bits stored by register 42 are provided to counter 30. When expansion card 14 is addressed by controller 12 or bus master expansion card 15 and a data transfer control signal is active on bus 16, memory counter 28 and I/O counter 30 begin counting.

More specifically, a transfer sequence which is synchronous to a system clock signal (CLK) (i.e., timing information), and is initiated by activating an address start transfer control signal (ADDST#) which is active low is shown in FIG. 4. The values which are stored in registers 40, 42 may be different for memory and I/O operations. E.g., in the example shown in FIG. 4, the value which is stored in register 42 requires three clock periods for card 14 to respond to each I/O data transfer and the value which is stored in register 40 requires zero clock periods for card 14 to respond to each memory transfer.

The first instance in which the ADDST# signal becomes active commences operation of timing circuit 18 for a double I/O transfer (i.e., two back-to-back transfers). The MIO signal is low when ADDST# is active indicating that the transfer is an I/O transfer. The low MIO signal enables AND gate 44 and disables AND gate 46. Accordingly, device ready control circuit 32 passes through the output of I/O counter 30 (GEN IOR).

Counter 30 is loaded with a value of three from register 42 while the ADDST# signal is active. Counter 30 is then enabled to count down during time periods when a data transfer control signal (DATT#) is active. An active DATT# signal indicates that bus 16 is in a data transfer mode. Counter 30 decrements on the falling edge of the CLK signal when enabled by the DATT# signal.

When the count of counter 30 gets to zero, the GEN IOR signal becomes active and is passed through AND gate 44 and OR gate 48 to latch 50. Latch 50 receives this signal and, on the rise of the CLK signal, issues the RDY signal which has a three clock period delay.

NAND gate 52 and AND gate 54 cause counter 30 to restart a count of three, so that the subsequent transfer is properly timed. More specifically, NAND gate 52 becomes active when the RDY signal is active along with the inverse of the DATT# signal and the CLK signal. The output of NAND gate 52 propagates through AND gate 54 when the ADDST# signal is high. The output of AND gate 54 (the LOAD COUNTERS signal) causes counter 36 to reload to the value which is stored in register 42. The same sequence is then repeated a second time and RDY is again issued after a three clock delay. The vertical ticks on the RDY signal of FIG. 4 indicate when controller circuit 12 samples the RDY signal via bus 16.

FIG. 4 also shows the timing for the output of gate 54 (the LOAD COUNTERS signal) and how counters 28, 30 are loaded every time the ADDST# signal or the RDY signal is active. In the preferred embodiment, counters 34, 36 are simultaneously loaded because for every operation, one counter is a "don't care".

In FIG. 4, the second active ADDST# signal initiates a memory transfer over bus 16. This same MIO signal enables AND gate 46 to monitor the output of counter 34, the GEN MR signal. Simultaneously, AND gate 44 is disabled by the MIO signal and is not used during Memory transfers. Counter 34 is loaded with the count of zero from register 30 while the ADDST# signal is active. Counter 34 is then enabled to count down during time periods when a data transfer control signal (DATT#) is active. An active DATT# signal indicates that bus 16 is in a data transfer mode. Counter 30 decrements on the falling edge of the CLK signal when enabled by the DATT# signal. In the example, zero is loaded into counter 34 and thus a zero delay is provided for memory transfers. I.e., the RDY signal is always active and never causes a delay. The RDY signal always being active continues to load counter 34 with zero every period of the CLK signal. Therefore, counter 34 never counts down; it is continually loaded to zero. Accordingly, the GEN MR signal is always active, and passes through AND gate 46 and OR 48 to keep latch 50 continually set.

OTHER EMBODIMENTS

Other embodiments are within the following claims.

For example, because one of counters 34, 36 is always idle, the outputs from registers 30 and 32 may be multiplexed to one common counter. When only one counter is used, the M-IO signal is used to determine which register 30, 32 loads the counter.

Also for example, the memory and I/O differentiation could be removed to give all transfers the same ready delay time whether the transfer is a memory transfer or a I/O transfer.

Also for example, the timing of the expansion card could be differentiated by more than memory and I/O. For example, the first transfer of a sequence of back-to-back transfers could have a first programmed delay and subsequent transfers could have a different programmed delay or card initialization I/O transfers could have a first programmed delay and normal I/O transfers could have a second programmed delay.

Also for example, the delay of the RDY signal could be dynamically changed by periodically loading the speed selection registers.

What is claimed is:

1. Data transfer apparatus for adapting a computer system having a bus connecting to expansion devices to interact compatibly with an expansion device designed to couple to a plurality of differently configured buses; said apparatus comprising:

a system clock generator for generating a cyclic system clock signal;

a synchronous bus for transferring data at a predetermined speed; said synchronous bus including a path for transmitting said system clock signal, said synchronous bus further including a signal path for conveying start signals to said expansion device, each start signal indicating that a data transfer is required between the expansion device and said bus;

an expansion device coupled to said bus containing circuitry selectively programmable to configure the respective device to conduct data transfers relative to said bus at one of a plurality of speeds including said predetermined speed; and means coupled to said bus for transferring programming signals via said bus to said programmable circuitry on said expansion device for selectively configuring said expansion device to conduct data transfers relative to said synchronous bus at said predetermined speed; said programming signals including data signals representing numerical timing information associated with said predetermined speed;

said programmable circuitry including:

a register for receiving and storing said data signals representing said numerical timing information; and a programmable timing circuit coupled to said register and said bus for utilizing said numerical timing information and said clock signals repeatedly to control data transfers between said respective expansion device and said bus at said predetermined speed, said programmable timing circuit including means for generating a ready signal after a predetermined number of cycles of said system clock signals following receipt of each said start signal, said ready signal indicating that the expansion device is ready to transfer data relative to said bus, and said predetermined number of cycles conforming each respective transfer to said predetermined speed, wherein said programmable timing circuit further includes two registers and two programmable counter circuits respectively associated with individual ones of said two registers, and wherein said numerical timing information contains two distinct numerical timing values that are stored in respective ones of said registers and are loaded cyclically from said registers into said respectively associated programmable counter circuits; said at least two counter circuits being stepped by said clock signals after loading of respective numerical timing values therein, and upon reaching a predetermined count state establishing conditions for enabling issuance of said ready signal; said timing circuit further including means for selecting between outputs of said counters, in data transfers designated by individual ones of said start signals, to variably control delays in issuance of said ready signal corresponding to said numerical values held in said respective registers.

2. The apparatus of claim 1 wherein said bus is subject to attachment to a plurality of different types of devices including memory devices and Input/Output devices, and wherein said bus includes a path for providing a selection signal for each said data transfer operation; each said selection signal indicating whether a respective data transfer is between said expansion device and a said memory device or between said expansion device and a said Input/Output device; one of said two programmable counters being associated with data transfers relative to a said memory device, and another of said two programmable counters being associated with data transfers relative to a said Input/Output device; said programmable timing circuit being responsive to said selection signal for selecting the output of one of said two programmable counters for controlling generation of said ready signal.

3. Apparatus in accordance with claim 1 wherein said programming signals are transmitted to said at least one expansion device during initialization of said system, establishing the respective said at least one expansion device in a predetermined configuration relative to said synchronous bus and said system.

4. An expansion device for attachment to a computer system having a synchronous bus with a predetermined configuration, said bus containing paths for conducting data signals and cyclic clock signals said expansion device being adaptable for transferring data relative to a plurality of differently configured buses including said synchronous bus; said expansion device comprising:

a programmable timing circuit coupled to said bus for receiving and storing configuration control data issued by said computer system during a first predetermined time interval preceding conduction of data transfers on said bus; said control data including timing information specifying a predetermined speed at which data is to be transferred between said expansion device and said bus wherein said timing information includes two discrete numerical values; said programmable timing circuit also including: means for receiving start signals via said bus after said first predetermined interval, each said start signal indicating that a data transfer is required to be conducted between said device and said bus; and means responsive to said start signal, said clock signals and said stored timing information for generating a ready signal at a predetermined time after receipt of each said start signal, said predetermined time conforming each said data transfer to said predetermined speed, wherein said programmable timing circuit generates said ready signal after a variable number of cycles of said clock signal determined specifically by said timing control information;

wherein said programmable timing circuit includes:

two programmable counters, two registers for separately storing said two numerical values in association with said two counters, means for repeatedly loading said two values from said registers into said associated counters, means for cyclically stepping said counters in synchronism with said clock signals, and means for generating a ready signal when a selected one of said two counters reaches a predetermined state after being loaded with the numerical values from the associated registers and stepped;

and wherein said bus is subject to attachment to memory and input/output devices with which said expansion device is able to communicate, and said bus further includes a path for providing a selection signal to said device; said selection signal indicating whether a data transfer is to be conducted between said expansion device and a said memory device or between said expansion device and a said input/output device; said programmable timing circuit being responsive to said selection signal for selecting one of said two programmable counters as said selected one of said two counters controlling generation of said ready signal.

5. An expansion device in accordance with claim 4 wherein said first predetermined time interval occurs during initialization of said computer system.

* * * * *